United States Patent
Koreis et al.

(10) Patent No.: US 10,974,085 B2
(45) Date of Patent: *Apr. 13, 2021

(54) FIRE EXTINGUISHING CONTAINER

(71) Applicant: THE BOEING COMPANY, Chicago, IL (US)

(72) Inventors: Rocke R. Koreis, Seattle, WA (US); Joseph A. Scarce, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/038,577

(22) Filed: Jul. 18, 2018

(65) Prior Publication Data

US 2018/0318618 A1    Nov. 8, 2018

Related U.S. Application Data

(63) Continuation of application No. 15/186,103, filed on Jun. 17, 2016, now Pat. No. 10,201,722.

(51) Int. Cl.
*A62C 3/08*    (2006.01)
*A62C 3/16*    (2006.01)
(Continued)

(52) U.S. Cl.
CPC .................. *A62C 3/08* (2013.01); *A62C 3/16* (2013.01); *A62C 4/02* (2013.01); *B64D 37/32* (2013.01); *A62C 3/06* (2013.01)

(58) Field of Classification Search
CPC .... A62C 3/00; A62C 3/06; A62C 3/07; A62C 3/08; A62C 3/16; A62C 4/00; A62C 4/02; A62C 4/04; A62C 2/065; B64D 37/32
See application file for complete search history.

(56) References Cited

U.S. PATENT DOCUMENTS 3,830,307 A    8/1974 Bragg et al.
4,541,545 A    9/1985 Beattie et al.
(Continued)

FOREIGN PATENT DOCUMENTS

CN        104114242 A    10/2014
DE   102013003128 A1     8/2014
(Continued)

OTHER PUBLICATIONS

Chinese Office Action for Application No. 2017104468052 dated Jun. 2, 2020.
(Continued)

*Primary Examiner* — Alex M Valvis
(74) *Attorney, Agent, or Firm* — Patterson + Sheridan, LLP

(57) ABSTRACT

An enclosure, vehicle, and method for containing an overheating device are provided. An enclosure includes a body and a door that form a volume. The body includes is connected to a Venturi tube that is in communication with a fluid flow path flowing across an opening at an opposite end. In the event an overheating device is placed in the enclosure, a pressure sensor measures a pressure in the volume and a controller opens a first valve in a flow path through the Venturi tube so that air is pumped from the volume via the Venturi effect. The first valve is closed when the measured pressure drops below a threshold pressure. The enclosure can also include an extinguishing agent that can be expelled into the volume if a temperature sensor measures a temperature above a threshold temperature.

20 Claims, 7 Drawing Sheets

(51) Int. Cl.
*A62C 3/06* (2006.01)
*A62C 4/02* (2006.01)
*B64D 37/32* (2006.01)

(56) References Cited

U.S. PATENT DOCUMENTS

| | | | |
|---|---|---|---|
| 4,616,694 A | 10/1986 | Hsieh | |
| 5,990,789 A | 11/1999 | Berman et al. | |
| 6,039,123 A * | 3/2000 | Webb | B60S 5/02 |
| | | | 141/82 |
| 7,900,709 B2 * | 3/2011 | Kotliar | A62C 3/0221 |
| | | | 169/45 |
| 10,201,722 B2 | 2/2019 | Koreis et al. | |
| 2004/0115103 A1 | 6/2004 | Peng et al. | |
| 2013/0327548 A1 | 12/2013 | Cailly | |
| 2015/0069068 A1 | 3/2015 | Hariram | |
| 2015/0328486 A1 | 11/2015 | Knijnenburg | |
| 2017/0283083 A1 * | 10/2017 | Behbahani-Pour | B64D 37/10 |
| 2018/0318618 A1 | 11/2018 | Koreis et al. | |

FOREIGN PATENT DOCUMENTS

| | | |
|---|---|---|
| GB | 2473424 A | 3/2011 |
| GB | 2553021 A | 2/2018 |
| WO | 2015187035 A1 | 12/2015 |

OTHER PUBLICATIONS

Intellectual Property Office Search Report for Application No. GB1708553.1 dated Nov. 23, 2017.
Office Action dated Jan. 17, 2018 for U.S. Appl. No. 15/186,103.
Final Office Action dated May 16, 2018 for U.S. Appl. No. 15/186,103.
Canadian Office Action for Application No. 2968385 dated Apr. 15, 2020.

* cited by examiner

FIRE EXTINGUISHING CONTAINER

CROSS-REFERENCE TO RELATED APPLICATIONS

This application is a continuation of copending U.S. patent application Ser. No. 15/186,103, filed Jun. 17, 2016, which is incorporate herein by reference.

BACKGROUND

Passengers traveling in vehicles, such as aircraft, trains, automobiles, buses, and boats, often carry and use portable electronic devices. Additionally, cargo vehicles, such as aircraft, trains, ships, and trucks, carry cargo containers that include potentially hazardous item, such as lithium ion batteries. In rare instances, batteries in these portable electronic devices or cargo containers can overheat and, in some instances, start a fire. Such overheating and/or fires can result in the vehicle stopping short of its destination or diverting to an alternative destination to address the overheating device. Such diversions are inconvenient.

SUMMARY

According to one aspect, an enclosure includes a container comprising a body and a door. The door is movable between an open position and a closed position and forms an airtight seal with the body in the closed position to define a volume in the container. The body includes a port in communication with an upstream end of a Venturi tube. A downstream end of the Venturi tube is in communication with a fluid flow path flowing across an opening at the downstream end. The enclosure also includes a pressure sensor arranged in the volume in the container, wherein the pressure sensor is operable to output a pressure signal. The enclosure also includes a first valve arranged in an air flow path through the port. The first valve is movable between an open state and a closed state. The enclosure also includes a controller operable, in an operable state, to: receive the pressure signal from the pressure sensor. The controller is further operable, in the operable state, to output first valve control signals to move the first valve to the open state in the event a value of the pressure signal exceeding a pressure threshold level and move the first valve to the closed state upon the value of the pressure signal dropping below the pressure threshold level.

According to one aspect, a vehicle includes a compartment and a container arranged in the compartment. The container comprises a body and a door. The door is movable between an open position and a closed position and forms an airtight seal with the body in the closed position to define a volume in the container. The body includes a port in communication with an upstream end of a Venturi tube. A downstream end of the Venturi tube is in communication with a fluid flow path across an opening at the downstream end. The container includes a pressure sensor arranged in the volume in the container, wherein the pressure sensor is operable to output a pressure signal. The container also includes a first valve arranged in an air flow path through the port, wherein the first valve is movable between an open state and a closed state. The container also includes a controller operable, in an operable state, to receive the pressure signal from the pressure sensor. The controller is also operable, in the operable state, to output first valve control signals to move the first valve to the open state in the event a value of the pressure signal exceeding a pressure threshold level and move the first valve to the closed state upon the value of the pressure signal dropping below the pressure threshold level.

According to one aspect, a method for containing an overheating device comprises opening a door of a container that includes a body and a door. The body includes a port in communication with an upstream end of a Venturi tube. A downstream end of the Venturi tube is in communication with a fluid flow path across an opening at the downstream end. The method also comprises placing the overheating device in a volume in the container. The method also comprises closing the door such that the door forms an airtight seal with the body. The method also comprises, using a controller, opening a first valve arranged in an airflow path through the port to decrease air pressure in the volume. The method also comprises, using a pressure sensor, measuring an air pressure of the volume. The method also comprises, using the controller, closing the first valve upon the measured air pressure of the volume decreasing below a pressure threshold level.

BRIEF DESCRIPTION OF ILLUSTRATIONS

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Passengers traveling in vehicles, such as aircraft, trains, automobiles, buses, and boats, often carry and use portable electronic devices. In rare instances, batteries in these portable electronic devices can overheat and, in some instances, catch on fire. In aspects described herein, an enclosure is provided in the vehicle for an overheating device to be placed therein. The enclosure contains the heat from the overheating device and also removes air such that any fire caused by the device cannot be sustained, or even started in the first instance. In various aspects, the enclosure includes an extinguishing agent that can be released into a volume containing the overheating device to extinguish any fire caused by the device.

Figure 1:
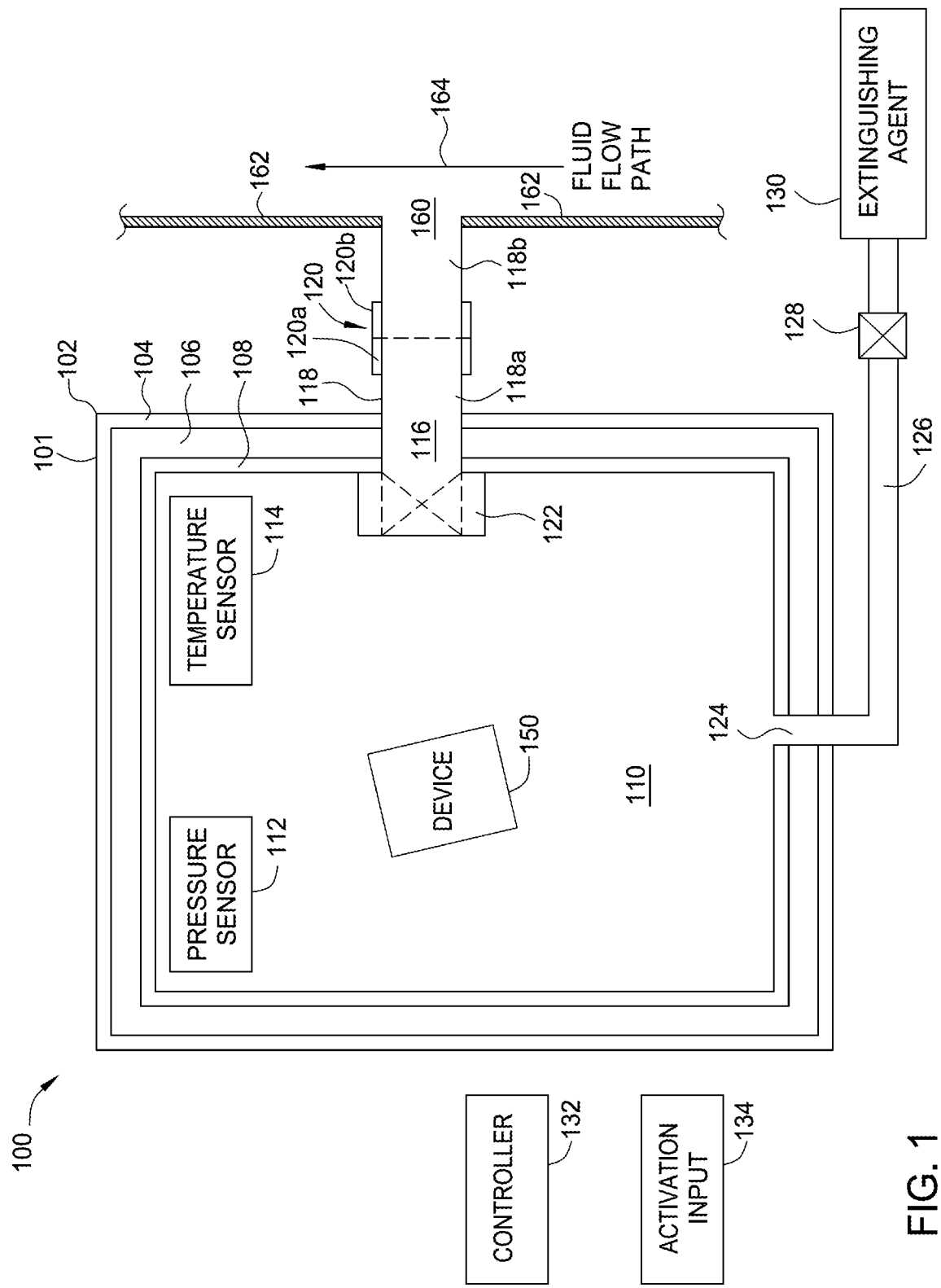
FIG. 1 is a top cross-sectional view of a body of a container according to one aspect.
Figure 2:
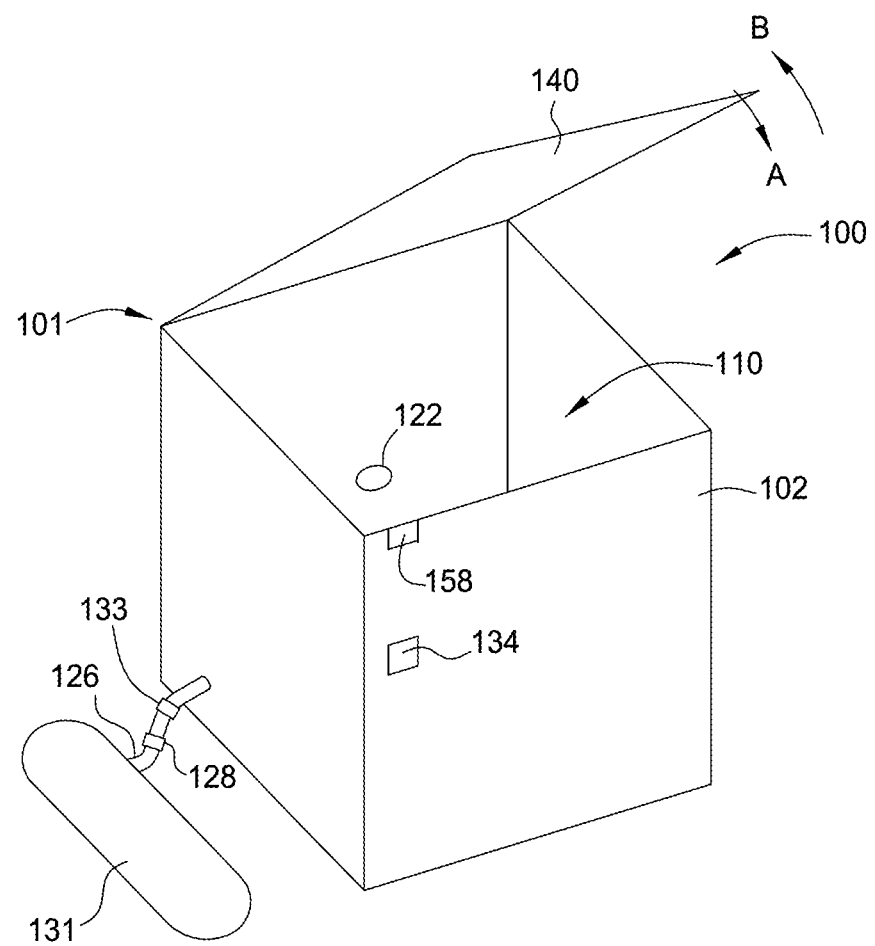
FIG. 2 is a front perspective view of the container of FIG. 1.

FIGS. 1 and 2 illustrate an enclosure 100 according to one aspect. FIG. 1 is a top cross-sectional view of the enclosure 100. The enclosure 100 includes a container 101. The container includes a body 102 that defines a volume 110. In the illustrated aspect, the body 102 is square or rectangular. In various other aspects, the body 102 could have a different shape, such as a cylindrical shape or a hexagonal shape. The body 102 includes three layers. An exterior layer 104 includes a steel alloy, a titanium alloy, and/or another metallic alloy. An interior layer 108 includes also a steel alloy, a titanium alloy, and/or another metallic alloy. An insulating layer 106 includes an insulating material, such as a refractory material (e.g., stone) and/or a phase change material. A refractory material reflects significant amounts of heat energy. A phase change material absorbs significant amounts of heat energy (e.g., from a device 150 that is overheating or on fire in the volume 110) as it changes from a solid phase to a liquid phase. The phase change material has a phase change temperature that is low enough that the exterior layer 104 of the body 102 remains at a safe temperature for at least a period of time with an overheating device 150 within the body 102. Various other aspects could have more or fewer layers than the three layers depicted in FIG. 1.

The body 102 includes a port 116 in communication with an upstream end of a Venturi tube 118. A downstream end 160 of the Venturi tube 118 is in communication with a fluid flow path, a freestream air flow path in this exemplary scenario, indicated by arrow 164. The fluid (e.g., air or water) flows across a surface 162. In one aspect, the surface 162 may be an exterior skin of an aircraft. In other embodiments, the surface 162 may be a tube through which high velocity fluid, such as air or water, travels. In certain aspects, the downstream end 160 of the Venturi tube 118 is flush with the surface 162 such that the freestream air flow path 164 is across the downstream end 160 (and not into the downstream end 160 of the Venturi tube 118). Fluid flowing past the downstream end 160 of the Venturi tube 118 has a lower pressure than the stationary air in the volume 110. As a result, the fluid flowing past the downstream end 160 of the Venturi tube 118 pumps air (and any other gases) from the volume 110. This pumping of air is known as the Venturi effect. In the case of a commercial aircraft flying at cruising altitude (e.g., 35,000 feet) and at cruising speed (e.g., Mach 0.80), the combination of reduced atmospheric pressure outside of the aircraft and the high-speed flow of air past the downstream end 160 of the Venturi tube 118 can reduce the atmospheric pressure in the volume 110 to a pressure altitude of approximately 200,000 feet, which is roughly approaching atmospheric pressure in the vacuum of space.

When an overheating device 150 is placed in the volume 110 in the body 102, a first valve 122 can be opened to expose the volume 110 to the Venturi effect, discussed above, via the Venturi tube 118. The resulting vacuum in the volume 110 can reduce the risk of the overheating device 150 catching fire. If the overheating device 150 has caught on fire, the resulting vacuum in the volume 110 can deprive the fire of oxygen, thereby causing the fire to extinguish. The first valve 122 is illustrated as being arranged upstream of the port 116 such that the valve is arranged in an air flow path through the port 116. In various aspects, the first valve 122 could be arranged in the port 116, in the Venturi tube 118, or at the downstream end 160 of the Venturi tube. In at least one aspect, the Venturi tube 118 or the first valve 122 could incorporate a flame arrestor that prevents flames from exiting the volume 110 via the Venturi tube 118.

The enclosure 100 includes a pressure sensor 112 that is operable to detect air pressure in the volume 110. The pressure sensor 112 outputs pressure signals to a controller 132. The controller 132 controls movement of the first valve 122 between a closed state (in which air is blocked from flowing through the first valve 122 into the Venturi tube 118) and an open state (in which air can flow through the first valve 122 into the Venturi tube 118). The controller 132 can compare values of the pressure signal received from the pressure sensor 112 to a pressure threshold level. When the enclosure 100 is being used, the controller 132 can control the first valve 122 to move to the open state (e.g., by sending a first valve control signal to the first valve 122) when the values of the pressure signal are above the pressure threshold level (i.e., when the pressure in the volume 110 rises above a pressure threshold) and can control the first valve 122 to move to the closed state when the values of the pressure signal are below the pressure threshold level (i.e., when the pressure in the volume 110 drops below the pressure threshold). In this manner, the first valve 122 can be moved to the open state after an overheating device 150 is placed in the volume 110 to reduce the pressure to a near vacuum and then the first valve 122 can be moved to the closed state. Thereafter, if the pressure rises above the threshold level (e.g., if the overheating device 150 vents any gases and/or heats the remaining air in the volume 110), the controller moves the first valve 122 to the open state again to reduce the pressure.

In certain aspects, the enclosure 100 can include an extinguishing agent 130 that can be applied to the volume 110 to extinguish a device 150 that is on fire. Examples of extinguishing agents 130 include water, halon, and/or a copper compound chemical extinguishing agent. Other suitable extinguishing agents could be used in various circumstances. The extinguishing agent 130 could be stored in a pressurized state in a pressurized container 131 (shown in FIG. 2), for example, such that when a second valve 128 is opened, the extinguishing agent 130 is propelled into the lower-pressure volume 110 via a tube 126 and another port 124 and the body 102. In one aspect, the second valve 128 is movable between a closed state (i.e., in which the extinguishing agent 130 is blocked from flowing through the tube 126 into the volume 110) and an open state (i.e., in which the extinguishing agent 130 can flow through the tube 126 into the volume 110). In another aspect, the second valve 128 includes a squib that quickly opens the valve. In such aspects, the second valve 128 does not close after it is opened and is replaced after being opened. In various other aspects, the second valve 128 is a check valve that opens upon a pressure differential between the extinguishing agent 130 and the volume 110 exceeding a particular amount. For example, the second valve 128 could open at a pressure differential experienced when the pressure in the volume 110 drops below a pressure altitude of 150,000 feet. Various other suitable pressure differentials could be used in different circumstances.

In aspects in which the second valve 128 is moved to the open state in a controlled manner (e.g., the squib and/or the valve that is movable between an open state in a closed state), the controller 132 can control the second valve 128. In such aspects, the enclosure 100 includes a temperature sensor 114 that measures a temperature of the overheating device 150. In one aspect, the temperature sensor 114 is a noncontact temperature sensor, such as an infrared sensor or other radiative heat detecting sensor. A noncontact temperature sensor may be advantageous because the near-vacuum pressure conditions in the volume 110 will result in negligible amounts of convective heat transfer for the temperature sensor 114 to detect. In the event an overheating device 150 is placed in the volume 110, the temperature sensor can measure a temperature of the overheating device 115 and output a temperature signal to the controller 132. If the value of the temperature signal exceeds a temperature threshold level (i.e., if the measured temperature exceeds a threshold temperature), then the controller 132 can control the second valve 128 (e.g., output a second valve control signal to the second valve 128) to cause the second valve 128 to open to release the extinguishing agent 130 into the volume 110. In one aspect, the threshold temperature is set at or slightly above the temperature of a particular type of fire, such as a fire caused by a lithium ion battery of a personal electronic device so that the extinguishing agent 130 is not used unless a fire actually develops. In another aspect, the threshold temperature is slightly below the temperature of a particular type of fire so that a fire does not start at all.

In at least one aspect, the controller 132 outputs the second valve control signal to the second valve 128 if the value of the temperature signal from the temperature sensor 114 exceeds the temperature threshold level and if the value of the pressure signal from the pressure sensor 112 is below the pressure threshold level. Such an aspect may be advantageous for at least two reasons. First, the combined conditions of near vacuum and the presence of the extinguishing agent improve the fire extinguishing capabilities of the enclosure 100. Second, as discussed above, if the value of the pressure signal is below the pressure threshold level, then the first valve 122 is in the closed state. As such, the extinguishing agent 130 will not be immediately removed from the volume 110 via the Venturi tube 118 when the second valve 128 is opened and the extinguishing agent 130 enters the volume 110.

FIG. 2 illustrates a perspective view of the enclosure 100 of FIG. 1. FIG. 2 illustrates a door 140 of the container 101 in an open position. The door 140 for the container 101 can be attached to the body 102 via a hinge such that the door 140 can be moved in the direction of arrow A toward a closed position and moved in the direction of arrow B toward the open position. When the door 140 is in the closed position, the door 140 forms an airtight seal with the body 102 such that air does not enter or escape from the volume 110 between the body 102 and the door 140. In various aspects, the container 101 includes a latch or other retention mechanism that holds the door 140 in the closed position. In various aspects, the latch could be controlled by the controller 132 such that the door 140 cannot be opened until certain conditions have been satisfied. For example, the controller 132 may keep the latch closed until the measured temperature of the portable device has been at or below a second threshold temperature for a particular period of time.

In at least one aspect, the controller 132 includes an operable state and an inactive state. In the operable state, the controller 132 operates the first valve 122 to control the pressure in the volume 110 and, in certain aspects, operates the second valve 128 to release the extinguishing agent 130, as discussed in the preceding paragraphs. In the inactive state, the controller 132 does not operate the first valve 122 and the second valve 128. In various aspects, the enclosure 100 includes an input to switch (i.e., transition) the controller 132 from the inactive state to the operable state. For example, referring to FIGS. 1 and 2, in one aspect, the enclosure 100 includes an activation input 134 to switch the controller 132 from the inactive state to the operable state. As an example, the activation input 134 could be a button arranged on the body 102 as illustrated in FIG. 2. When a user presses the button, the controller 132 is switched from the inactive state to the operable state. As another example, the activation input 134 could be a switch or a guarded switch. When a user toggles switch, the controller 132 receives an activation signal and transitions from the inactive state to the operable state. In the event a portable device (e.g., the portable device 150 shown in FIG. 1) overheats and/or catches on fire, a person opens the door 140, places the device in the volume 110, closes the door 140, and actuates the activation input 134, thereby causing the controller to switch from the inactive state to the operable state. Thereafter, the controller 132 (in the operable state) operates the first valve 122 to decrease the pressure in the volume 110 to near vacuum conditions and, in some aspects, operates the second valve 128 to apply the extinguishing agent 130 to the device.

In various other aspects, the container 101 includes a contact switch 158 or other sensor that detects when the door 140 is in the closed position. In such aspects, the controller 132 is switched from the inactive state to the operable state upon the door 140 being moved from the closed position (i.e., toward the open position shown in FIG. 2) and then returned to the closed position. In the event a portable device (e.g., the portable device 150 shown in FIG. 1) overheats and/or catches on fire, a person would open the door 140, place the device in the volume 110, and then close the door 140. Closing the door 140 actuates the contact switch 158, thereby causing the controller to switch from the inactive state to the operable state. Thereafter, the controller 132 operates the first valve 122 to decrease the pressure in the volume 110 to near vacuum conditions and, in some aspects, operates the second valve 128 to apply the extinguishing agent 130 to the device.

In various circumstances, it may be advantageous to remove the container 101 from the vehicle in the event that the enclosure 100 was used for an overheating portable electronic device. Accordingly, at least one aspect of the enclosure includes a quick disconnect connection 120 on the Venturi tube 118. Referring to FIG. 1, the Venturi tube 118 can include a first Venturi tube portion 118a attached to the body 102 and a second Venturi tube portion 118b attached to the surface 162 (e.g., the fuselage of an aircraft). The quick disconnect connection 120 includes a first connector 120a and a second connector 120b that can be quickly connected and disconnected. When the first connector 120a and the second connector 120b are connected, the first Venturi tube portion 118a and the second Venturi tube portion 118b are in fluid communication such that air in the volume 110 can be pumped out due to the Venturi effect, described above. In the event the enclosure 100 is used for an overheating device, the first valve 122 can be moved to the closed state to seal the volume 110. Thereafter, a person could disconnect the quick disconnect connection 120 allow the container 101 to be removed from the vehicle. The container 131 holding the extinguishing agent 130 could be attached to an exterior of the container 101 such that the extinguishing agent 130 can be removed with the container 101. In various aspects, a second quick disconnect connection 133 could be arranged on the tube 126 from the container 131 holding the extinguishing agent 130 to the body 102 so that the container 101 can also be separated from the extinguishing agent 130. In at least one aspect, the quick disconnect connection 120 closes (e.g., seals) the Venturi tube portion 118b in the event the container 101 is removed. Such a quick disconnect connection 120 enables the vehicle to operate without a container in place.

In various aspects, the enclosure 100 includes a display screen (e.g., a liquid crystal display (LCD) or an organic light emitting diode (OLED)) that receives a temperature indication from the controller 132 to display a temperature of the device 150 in the volume 110. A user can monitor the displayed temperature to determine whether any overheating and/or fire have been stopped. In various other aspects, the body 102 can include a quartz window that enables a user to see the device 150 in the volume 110 and thereby visually determine whether any overheating and/or fire have been stopped.

Figure 3:
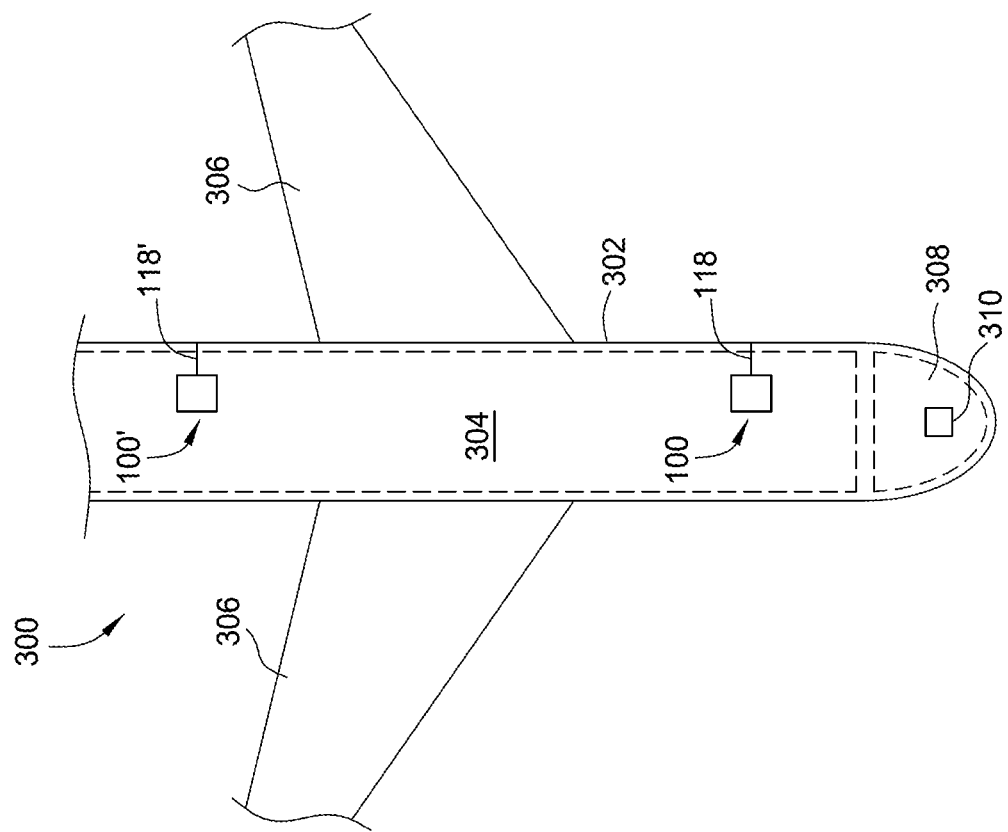
FIG. 3 is a partial top cross-sectional view of an aircraft with two containers, according to another aspect, arranged in a passenger compartment of the aircraft.

FIG. 3 is a partial top cross-sectional view of an aircraft 300 that includes a fuselage 302, wings 306 extending from the fuselage 302, and a passenger compartment 304 within the fuselage 302. FIG. 3 illustrates the first enclosure 100 arranged toward a forward end of the passenger compartment 304 and a second enclosure 100' arranged toward an aft end of the passenger compartment 304. The first enclosure 100 is in fluid communication with an exterior of the fuselage 302 via a first Venturi tube 118 and the second enclosure 100' is in fluid communication with the exterior of the fuselage 302 via a second Venturi tube 118'. In the event a personal electronic device overheats and/or catches fire during flight, a passenger or flight attendant, for example, could take the device to the closest of the first enclosure 100 and the second enclosure 100' to contain the device.

In various aspects, the first enclosure 100 and the second enclosure 100' are in communication with electronic equipment 310 (e.g., avionics) in the flight deck 308 of the aircraft 300. In the event the first enclosure 100 and/or the second enclosure 100' is used, as described above, then the controller for the used enclosure could output a signal to the electronic equipment 310 in the flight deck 308. The electronic equipment 310 could, in turn, provide the pilots with an alert so that the pilots know that there was an issue with a portable electronic device on board the aircraft 300. For example, the pilot(s) could receive a notification message on an engine-indicating and crew-alerting system (EICAS). As another example, a warning light could illuminate on a control panel on the flight deck 308.

Figure 4:
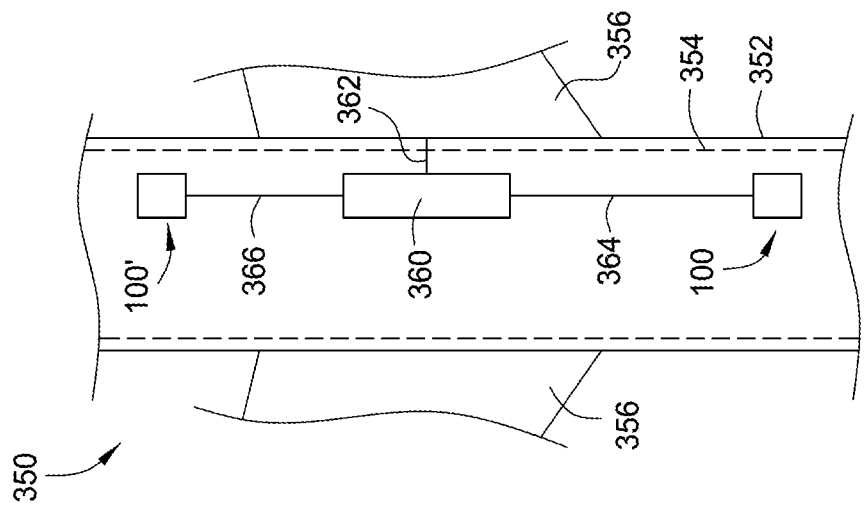
FIG. 4 is a partial top cross-sectional view of an aircraft with two containers, according to another aspect, arranged in a passenger compartment of the aircraft.

FIG. 4 is a partial top cross-sectional view of another aircraft 300 that includes a fuselage 352, wings 356 extending from the fuselage 352, and a passenger compartment 354 within the fuselage 302. In the aspect illustrated in FIG. 4, a single Venturi tube 362 communicates with an exterior of the fuselage 352. The single Venturi tube 362 is in communication with a plenum 360 within the aircraft 350. As shown in FIG. 4, the plenum 360 is arranged in the passenger compartment 354. In various aspects, the plenum 360 could be arranged outside of the passenger compartment 354. For example, the plenum 360 could be located in a baggage compartment and/or an equipment bay of the aircraft. FIG. 4 illustrates a first enclosure 100 arranged toward a forward end of the passenger compartment 354 and a second enclosure 100' arranged toward an aft end of the passenger compartment 354. The first enclosure 100 is in fluid communication with the plenum 360 via a first tube 364 and the second enclosure 100' is in fluid communication with the plenum 360 the second tube 366. In the arrangement shown in FIG. 4, the pressure in the plenum 360 is reduced to a near vacuum during flight due to the Venturi effect at the Venturi tube 362. In the event the first enclosure 100 and/or the second enclosure 100' is used to contain an overheating personal electronic device, air is drawn out of the used enclosure by the near vacuum conditions in the plenum 360 and is, in turn, drawn out of the aircraft via the Venturi tube 362.

Figure 5A:
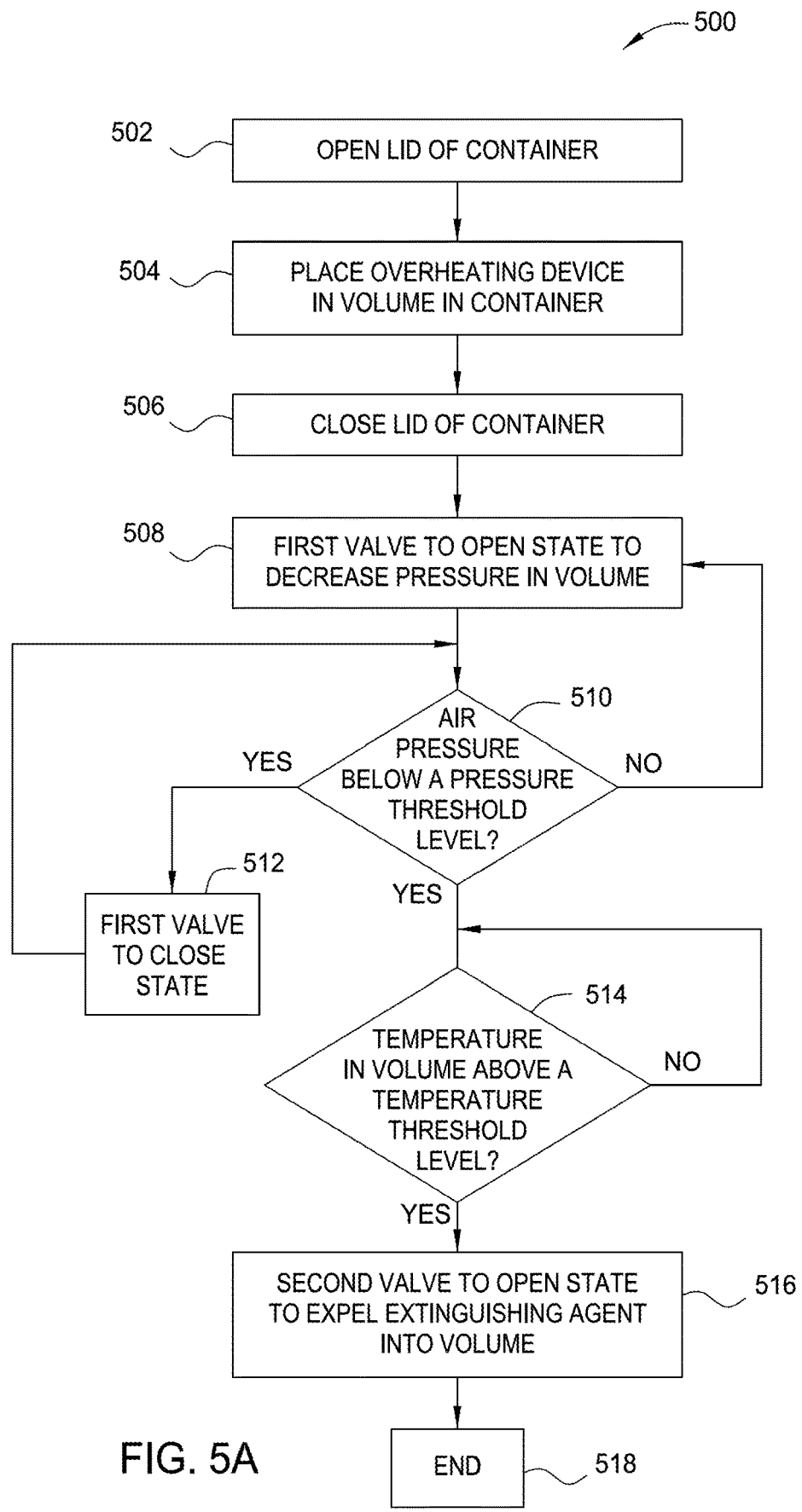
FIG. 5A is a flow chart illustrating a method for containing a portable electronic device that is overheating according to one aspect.

FIG. 5A illustrates a method 500 for containing an overheating portable electronic device according to one aspect. In block 502 of the method 500, a door of a container (e.g., the container 101 illustrated in FIGS. 1 and 2) is opened. In block 504, an overheating device is placed in a volume within the container. In block 506, the door of the container is closed, forming an airtight seal with a body of the container. In block 508, a first valve is moved to an open state to decrease pressure in the volume. As discussed above with reference to FIGS. 1 and 2, the valve is in a flow path for a Venturi tube (e.g., the Venturi tube 118), and a Venturi effect through the Venturi tube pumps air from the volume. In block 510, a determination is made as to whether air pressure in the volume is below a pressure threshold level. As discussed above with reference to FIGS. 1 and 2, a pressure sensor can measure an air pressure in the volume. A controller can compare the pressure measurement from the pressure sensor to a threshold pressure to determine whether the pressure in the volume is above or below the threshold pressure. If the measured air pressure is not below the threshold level, then the method 500 returns to block 508, maintaining the first valve in the open state to decrease the pressure in the volume. If the measured air pressure is below the threshold level, then the method 500 proceeds to block 512, in which the first valve is moved to a closed state. Thereafter, the method 500 returns to block 510 to determine whether the air pressure remains below the pressure threshold level. In the event the pressure rises above the pressure threshold level, then the method 500 returns to block 508 and moves the first valve from the closed state to the open state to decrease the pressure to a level below the pressure threshold. As discussed above, an overheating device may emit gases, smoke, fumes, or the like that cause the pressure in the volume to increase if the first valve is in the closed state. Thus, the first valve may be periodically moved to the open state, as discussed above, to remove these emitted gases.

In the event the method 500 results in the air pressure dropping below a threshold pressure level in block 510, the method also proceeds to block 514 to determine whether a temperature in the volume is above a temperature threshold. As discussed above, a temperature sensor, such as an infrared sensor, is arranged to measure a temperature of the device that was placed in the volume. The controller can receive the temperature measurement from the temperature sensor and compare the measured temperature to a temperature threshold. In the event the measured temperature is below the temperature threshold level, the method 500 repeats block 514. In the event the measured temperature is above the temperature threshold level, the method 500 proceeds to block 516 in which a second valve is moved to an open state to expel and extinguishing agent into the volume. The extinguishing agent can prevent the portable electronic device from catching on fire and/or can extinguish a fire caused by the portable electronic device within the volume. In block 518, the method 500 ends.

Figure 5B:
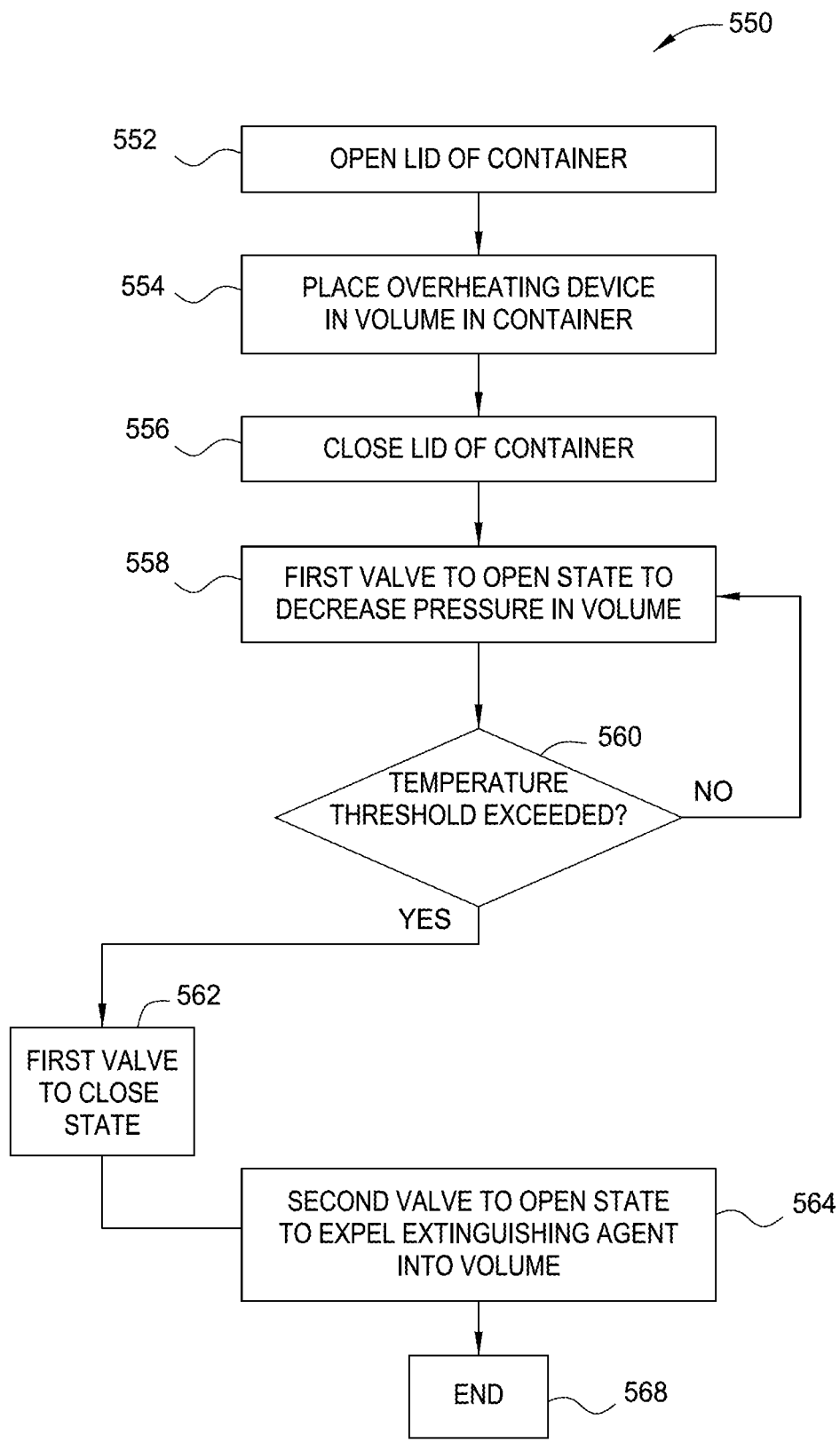
FIG. 5B is a flow chart illustrating a method for containing a portable electronic device that is overheating according to another aspect.

FIG. 5B illustrates a method 550 for containing an overheating portable electronic device according to another aspect. In block 552 of the method 550, a door of a container (e.g., the container 101 illustrated in FIGS. 1 and 2) is opened. In block 554, an overheating device is placed in a volume within the container. In block 556, the door of the container is closed, forming an airtight seal with a body of the container. In block 558, a first valve is moved to an open state to decrease pressure in the volume. As discussed above with reference to FIGS. 1 and 2, the valve is in a flow path for a Venturi tube (e.g., the Venturi tube 118), and a Venturi effect through the Venturi tube pumps air from the volume. In block 560, a temperature of the device in the chamber is measured. If the temperature is below a temperature threshold, then the method returns to block 558 to monitor the temperature repeatedly. If the temperature is above the threshold, then the method 550 proceeds to block 562, in which the first valve is moved to a closed state. Thereafter, the method 550 moves to block 564, in which a second valve is opened to expel an extinguishing agent into the volume. Thereafter, the method ends in block 568.

Figure 7:
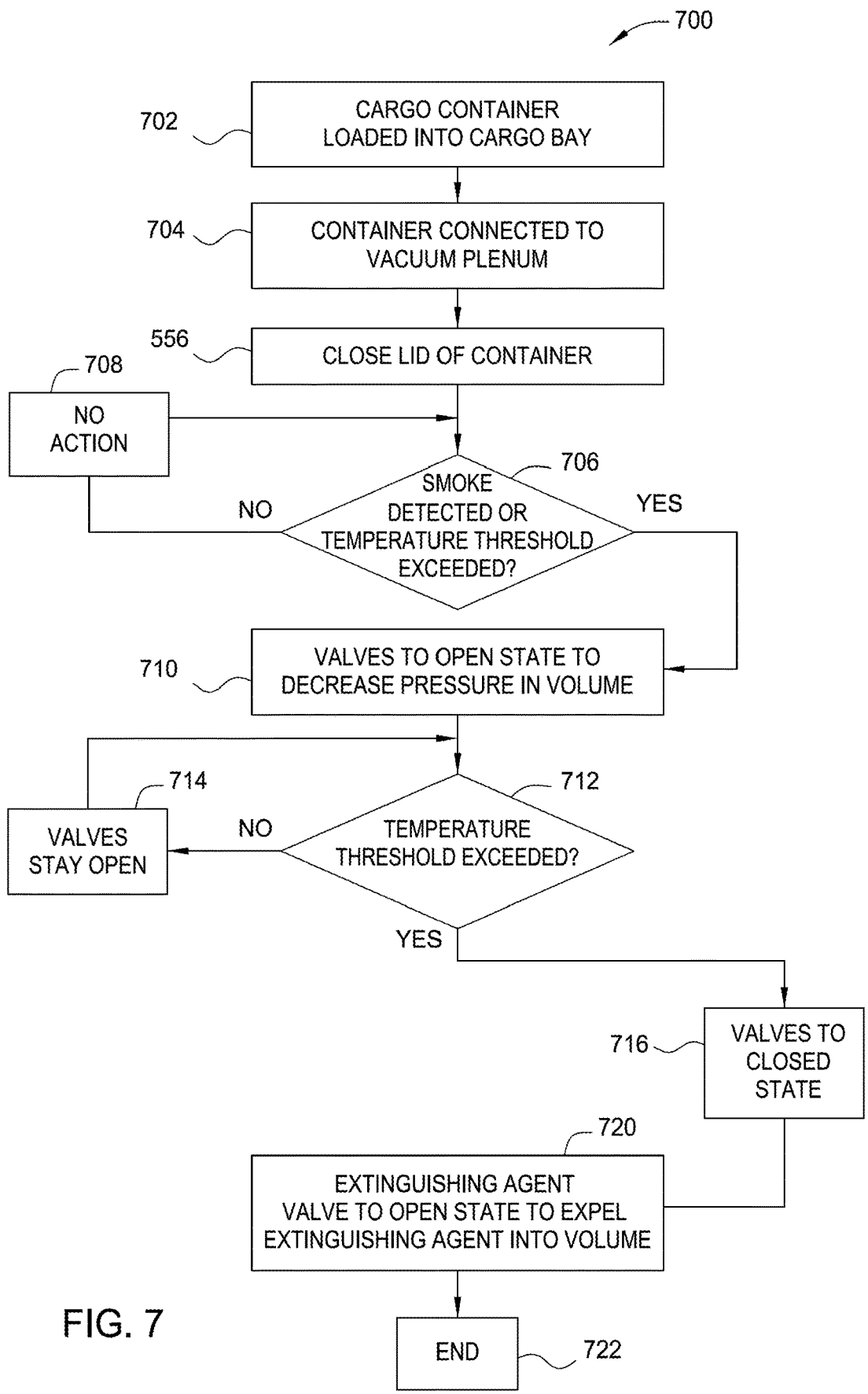
FIG. 7 is a flow chart for a method for containing overheating cargo in a cargo container.

FIG. 7 illustrates an aircraft 600 according to one aspect, in which a cargo compartment 604 in the fuselage 602 of the aircraft 600 includes a Venturi-based vacuum connectable to cargo containers in the cargo compartment 604. The aircraft 600 is illustrated as carrying four cargo containers 632, 634, 636, and 638 in the cargo compartment 604. In various circumstances, an aircraft may carry more or fewer containers. Such containers are typically loaded/unloaded with cargo at a location away from the aircraft and transported to the aircraft for placement in the cargo compartment 604. The cargo compartment includes a vacuum plenum 614 that is in communication with at least one Venturi tube. FIG. 7 depicts a first Venturi tube 606 and a second Venturi tube 608 connected to the vacuum plenum 614. In other aspects, the vacuum plenum 614 could be connected to a single Venturi tube or three or more Venturi tubes. The Venturi tubes 606 and 608 are also in communication with an exterior surface of the fuselage 602 of the aircraft 600, as discussed above with reference to FIG. 1. The Venturi tubes 606 and 608 include respective valves 610 and 612 that can be moved to an open state when the aircraft is flying to evacuate air from the vacuum plenum 614 due to the Venturi effect. The Venturi tubes 606 and 608 can be in a closed state when the vacuum plenum 614 is not needed.

The cargo containers 632, 634, 636, and 638 are connected to the vacuum plenum 614 via respective tubes 616, 620, 624, and 628. The tubes 616, 620, 624, and 628 include respective valves 618, 622, 626, and 630 that are movable between open and closed states such that the low pressure in the vacuum plenum 614, caused by the Venturi effect via the Venturi tubes 606 and 608, removes air from the respective cargo containers 632, 634, 636, 638. In the event cargo in a particular one of the cargo containers overheats, the valves 610 and 612 for the Venturi tubes 606 and 608, respectively, can be moved to the open state and the valve for the particular cargo container can also be moved to an open state. For example, if a temperature sensor 650 in a first cargo container 632 outputs a temperature measurement above a first threshold temperature, then a controller 680 moves the valves 610 and 612 of the Venturi tubes 606 and 608 to the open position and also move the valve 618 for the tube 616 connecting the cargo container 632 to the vacuum plenum 614. As a result, the pressure in the vacuum plenum 614 and, in turn, the cargo container 632 will drop to a low pressure that will prevent the overheating device from catching on fire and/or will likely extinguish a fire that has started. The cargo container 632 includes an additional valve 640 in communication with an extinguishing agent. In the event a fire is detected (e.g., if the temperature measured by the temperature sensor 650 exceeds a second threshold temperature higher than the first threshold temperature), then the controller 680 can open the additional valve 640 to release the extinguishing agent to put out a fire in the cargo container 632.

As another example, if a temperature sensor 652 in a second cargo container 634 outputs a temperature measurement above a first threshold temperature, then the controller 680 moves the valves 610 and 612 of the Venturi tubes 606 and 608 to the open position and also move the valve 622 for the tube 620 connecting the cargo container 634 to the vacuum plenum 614. As a result, the pressure in the vacuum plenum 614 and, in turn, the cargo container 634 will drop to a low pressure that will prevent the overheating device from catching on fire and/or will likely extinguish a fire that has started. The cargo container 634 includes an additional valve 642 in communication with an extinguishing agent. In the event a fire is detected (e.g., if the temperature measured by the temperature sensor 652 exceeds a second threshold temperature higher than the first threshold temperature), then the controller 680 can open the additional valve 642 to release the extinguishing agent to put out a fire in the cargo container 634.

As another example, if a temperature sensor 654 in a third cargo container 636 outputs a temperature measurement above a first threshold temperature, then the controller 680 moves the valves 610 and 612 of the Venturi tubes 606 and 608 to the open position and also move the valve 626 for the tube 624 connecting the cargo container 636 to the vacuum plenum 614. As a result, the pressure in the vacuum plenum 614 and, in turn, the cargo container 636 will drop to a low pressure that will prevent the overheating device from catching on fire and/or will likely extinguish a fire that has started. The cargo container 636 includes an additional valve 644 in communication with an extinguishing agent. In the event a fire is detected (e.g., if the temperature measured by the temperature sensor 654 exceeds a second threshold temperature higher than the first threshold temperature), then the controller 680 can open the additional valve 644 to release the extinguishing agent to put out a fire in the cargo container 636.

As another example, if a temperature sensor 656 in a fourth cargo container 638 outputs a temperature measurement above a first threshold temperature, then the controller 680 moves the valves 610 and 612 of the Venturi tubes 606 and 608 to the open position and also move the valve 630 for the tube 628 connecting the cargo container 638 to the vacuum plenum 614. As a result, the pressure in the vacuum plenum 614 and, in turn, the cargo container 638 will drop to a low pressure that will prevent the overheating device from catching on fire and/or will likely extinguish a fire that has started. The cargo container 638 includes an additional valve 646 in communication with an extinguishing agent. In the event a fire is detected (e.g., if the temperature measured by the temperature sensor 656 exceeds a second threshold temperature higher than the first threshold temperature), then the controller 680 can open the additional valve 646 to release the extinguishing agent to put out a fire in the cargo container 638.

The valves 618, 622, 626, and 630 associated with the respective tubes 616, 620, 624, and 628 could be positioned in the respective tubes 616, 620, 624, and 628, in the respective cargo containers 632, 634, 636, and 638, or in the vacuum plenum 614. Similarly, the valves 610 and 612 associated with the respective Venturi tubes 606 and 608 could be positioned in the Venturi tubes 606 and 608 or in the vacuum plenum 614.

Figure 6:
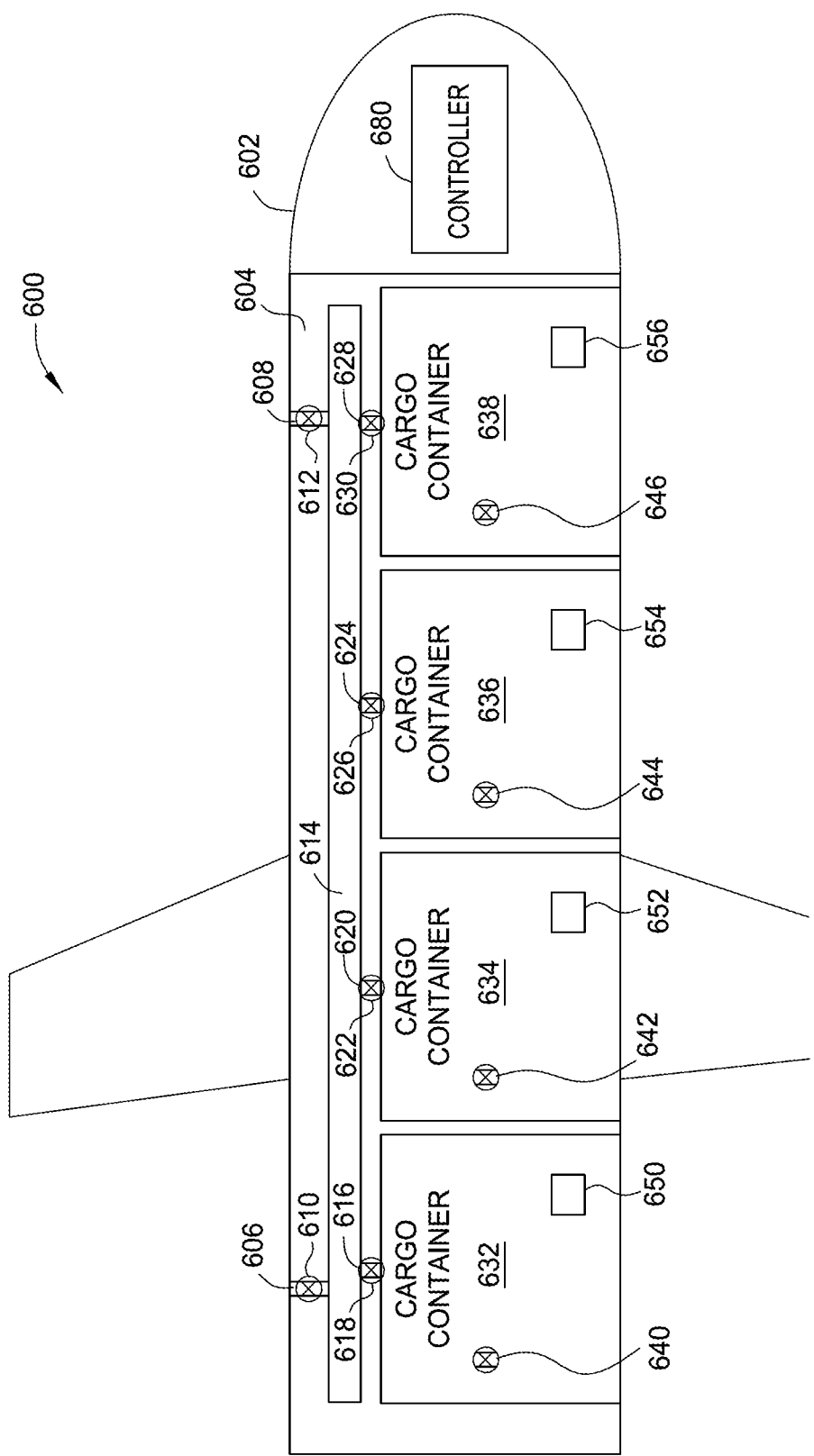
FIG. 6 is a top cross-sectional view of an aircraft with four cargo containers, according to another aspect, wherein the cargo containers are arranged in a cargo compartment of the aircraft and connected to a vacuum plenum.

FIG. 7 is a flow chart, according to one aspect, for a method 700 for containing overheating cargo in a cargo container, such as the cargo containers 632, 634, 636 and 638 depicted in FIG. 6. In block 702 of the method, cargo containers are loaded into a cargo compartment or cargo bay of a vehicle, such as an aircraft. In block 704, the cargo containers are connected to a vacuum plenum which is connected to one or more Venturi tubes. During operation of the vehicle, internal volumes of the cargo containers are individually monitored in block 706 to detect a temperature increase and/or the presence of smoke. For example, as discussed above, the cargo containers could include individual temperature sensors and/or individual smoke detectors. In the event that no smoke is detected and a temperature increase above a temperature threshold is not detected, then the method proceeds to block 708 in which no action is taken. Then, the method returns to block 706 to detect a temperature increase and/or the presence of smoke. In the event that smoke is detected and/or a temperature increase above a temperature threshold is detected, then the method 700 proceeds to block 710. For example, suppose that the temperature sensor 650 in the cargo container 632 detects a temperature above a first threshold temperature. The first threshold temperature can be a temperature indicating that something stored in the container is overheating. The first threshold temperature could be set to different levels based on the cargo stored in the container. In such a scenario, in block 710, valves to one or more Venturi tubes (e.g., valves 610 and 612 in Venturi tubes 606 and 608, respectively, in FIG. 6) are moved to an open state to reduce the pressure in the vacuum plenum 614 and the valve 618 in the tube 616 from the cargo container 632 to the vacuum plenum 614 is also opened to evacuate air from the cargo container 632. The valves 622, 626, and 630 associated with the remaining cargo containers 634, 636, and 638 remain closed such that only the affected cargo container 632 is exposed to low pressure conditions.

After block 710, the method moves to block 712 to detect a temperature above a second threshold temperature. The second threshold temperature could be associated with a temperature at which items stored in the container are on fire. In the event the temperature does not exceed the second threshold temperature, then the method 700 moves to block 714 and maintains the valves to the one or more Venturi tubes and the valve to the affected cargo container in the open states. The method 700 then returns to block 712 to continue monitoring the temperature to determine whether the temperature exceeds the second threshold temperature. In the event the measured temperature exceeds the second threshold temperature, then the method 700 proceeds to block 716, and closes the valves to the one or more Venturi tubes and the valve to the affected cargo container. Then, in block 720, another valve in the cargo container (e.g., valve 640 in the cargo container 632) is moved to the opened state to release an extinguishing agent into the cargo container. As discussed above, the valves to the Venturi tube(s) and the valve to the container are moved to the closed state prior to moving the valve for the extinguishing agent to the open state to ensure that the extinguishing agent remains in the cargo container. In various aspects, the valves to the Venturi tube(s) and the valve to the container could remain in the closed state when the extinguishing agent is released. Stated differently, after a temperature that exceeds the second threshold temperature is detected in block 712 of the method 700, block 716 could be skipped and the method can proceed to block 720 to open the valve for the extinguishing agent. After the extinguishing agent is released, the method 700 ends at block 722.

As discussed above with reference to FIG. 1, in at least one aspect, the second valve 128 can be moved to the open state to expel the extinguishing agent concurrently with the first valve 122 being moved to the open state. With reference to FIG. 5, in such aspects, blocks 508 and 514 are performed concurrently after the door is closed in block 506.

The aspects discussed above have been described in the context of use of an enclosure on board an aircraft. Various aspects of an enclosure could be used in other vehicle applications in which high-speed fluid flows past the vehicle. For example, high-speed trains and/or high-speed boats could incorporate enclosures according to at least one aspect. In various other circumstances, a vehicle could create a fast flowing fluid to provide for a Venturi effect to pump air out of the volume for an overheating device or a device that is on fire. For example, container ships sometimes carry flammable cargo in particular containers. In such circumstances, the cargo containers carrying flammable cargo could be fitted with airtight doors (e.g., the doors serve as the door, described in the aspects above) and the cargo containers could be attached via pipes or tubes in communication with a water tube in the ship. In the event one of the cargo containers carrying flammable cargo overheats and/or the contents therein catch on fire, a pump activates to pump water from the body of water (e.g., seawater or freshwater) at high-speed through the water tube. The high-speed water pumps air from the cargo containers, thereby depriving any overheating and/or combusting cargo of oxygen to sustain the fire.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. An enclosure, comprising:
a container having a door and defining a volume therein, the volume fluidly coupled to a fluid flow path through a Venturi tube, the fluid flow path flowing across an opening of a downstream end of the Venturi tube;
a first valve arranged to control fluid flow through the Venturi tube between the volume and the fluid flow path, wherein the first valve is movable between an open state and a closed state;
a temperature sensor arranged in the volume of the container, wherein the temperature sensor is operable to output a temperature signal;
a pressurized extinguishing agent; and
a second valve arranged in a flow path between the pressurized extinguishing agent and the volume in the container, wherein the second valve is changeable from a closed state to an open state; and a controller having an operable state and an inactive state, the controller transitioning from the inactive state to the operable state upon the door of the container being moved from a closed position to an open position and returned to the closed position, wherein the controller is operable, in an operable state, to:

receive a pressure signal from a pressure sensor indicative of a pressure within the volume; and output first valve control signals to:

move the first valve to the open state in the event a value of the pressure signal indicates a pressure threshold level within the volume is exceeded, thereby reducing pressure in the volume to a first reduced pressure through a Venturi effect; and move the first valve to the closed state upon the value of the pressure signal indicating the pressure within the volume is below the pressure threshold level to maintain the pressure within the volume at the first reduced pressure;

receive the temperature signal from the temperature sensor; and output a second valve control signal to change the second valve from the closed state to the open state upon:

a value of the temperature signal indicating a temperature threshold level is exceeded; and the volume being maintained at the first reduced pressure.

2. The enclosure of claim 1, wherein the enclosure further comprises an activation input on an exterior of the container, and wherein the controller transitions from the inactive state to the operable state upon the controller receiving an activation signal from the activation input.

3. The enclosure of claim 1, wherein the container includes an interior layer, an exterior layer, and an insulating layer arranged between the interior layer and exterior layer.

4. The enclosure of claim 3, wherein the interior layer and exterior layer each comprise at least one of a steel alloy and a titanium alloy.

5. The enclosure of claim 3, wherein the insulating layer comprises at least one of: a refractory material and a phase change material.

6. An aircraft, comprising:

a passenger compartment;

a container arranged in the passenger compartment, the container defining a volume therein, the container including a body having a port, a Venturi tube in communication with the container and comprising a first tube portion attached to the container and a second tube portion attached to a fuselage of an aircraft, wherein a downstream end of the Venturi tube is in communication with a freestream air flow path over an exterior of the fuselage of the aircraft, the downstream end of the Venturi tube flush with the exterior of the fuselage;

a first valve arranged in an air flow path through the port, wherein the first valve is movable between an open state and a closed state; and a controller operable, in an operable state, to:

receive a pressure signal from a pressure sensor indicative of a pressure within the volume of the container; and output first valve control signals to:

move the first valve to the open state in the event a value of the pressure signal indicates a pressure threshold level within the volume is exceeded, thereby reducing pressure in the volume to a first reduced pressure through a Venturi effect; and move the first valve to the closed state upon the value of the pressure signal indicating the pressure within the volume is below the pressure threshold level to maintain the pressure within the volume at the first reduced pressure.

7. The aircraft of claim 6, further comprising:

a temperature sensor arranged in the volume in the container, wherein the temperature sensor is operable to output a temperature signal;

a pressurized extinguishing agent; and a second valve arranged in a flow path between the pressurized extinguishing agent and the volume in the container, wherein the second valve is changeable from a closed state to an open state, wherein the controller is further operable, in the operable state, to:

receive the temperature signal from the temperature sensor; and output a second valve control signal to change the second valve from the closed state to the open state upon a value of the temperature signal indicating a temperature threshold level is exceeded.

8. The aircraft of claim 7, wherein the controller outputs the second valve control signal upon the temperature signal indicating a temperature threshold level is exceeded and upon the pressure signal dropping indicating the pressure within the volume of the container is below the pressure threshold level.

9. The aircraft of claim 6, wherein the controller is further operable to transmit an activation signal to avionics in a flight deck of the aircraft, and wherein the avionics display a notification to a pilot of the aircraft in response to receiving the activation signal.

10. A method for containing an overheating device in a passenger compartment of an aircraft, comprising:

opening a container that includes a body and a door, wherein the body includes a port in communication with an upstream end of a Venturi tube, the Venturi tube comprising a first tube portion attached to the container and a second tube portion attached to a fuselage of the aircraft, and wherein a downstream end of the Venturi tube is in communication with a fluid flow path across an exterior of the fuselage, the downstream end flush with the exterior of the fuselage;

placing the overheating device in a volume in the container;

closing the door such that the door forms an airtight seal with the body;

using a controller in an operable state;

receiving a pressure signal from a pressure sensor indicative of a pressure within the volume of the container;

output first valve signals to open a first valve arranged in an airflow path through the port to decrease pressure in the volume through a Venturi effect in the event a value of the pressure signal indicates a pressure threshold level within the volume is exceeded, the first valve movable between an open state and a closed state;

measuring the pressure of the volume; and using the controller, closing the first valve upon the measured pressure of the volume decreasing below the pressure threshold level to maintain a decreased pressure within the container while maintaining the overheating device therein.

11. The method of claim 10, further comprising:

using a temperature sensor, measuring a temperature in the volume; and using the controller, opening a second valve to enable entry of a pressurized extinguishing agent into the volume upon the measured temperature exceeding a temperature threshold level.

12. The method of claim 11, wherein opening the second valve using the controller comprises opening a second valve to enable entry of a pressurized extinguishing agent into the volume upon the measured temperature exceeding a temperature threshold level and upon the measured pressure dropping below the pressure threshold level.

13. The method of claim 10, wherein the container includes an activation input, and wherein applying an input to the activation input causes the controller to open the first valve.

14. The method of claim 13, further comprising displaying an image on a liquid crystal or organic light emitting diode display screen disposed on the container.

15. The method of claim 14, wherein the display screen displays a temperature of the volume.

16. The method of claim 15, further comprising displaying a notification message on an engine-indicating and crew-alerting system (EICAS).

17. The method of claim 10, further comprising displaying an image on a display screen disposed on the container.

18. The method of claim 17, wherein the display screen displays a temperature of the volume.

19. The method of claim 18, further comprising displaying a notification message on an engine-indicating and crew-alerting system (EICAS).

20. The method of claim 17, wherein the display screen is a liquid crystal or organic light emitting diode display screen.

* * * * *

UNITED STATES PATENT AND TRADEMARK OFFICE
CERTIFICATE OF CORRECTION

PATENT NO. : 10,974,085 B2
APPLICATION NO. : 16/038577
DATED : April 13, 2021
INVENTOR(S) : Rocke R. Koreis et al.

Page 1 of 1

It is certified that error appears in the above-identified patent and that said Letters Patent is hereby corrected as shown below:

In the Claims

In Column 13, Line 49, in Claim 6, delete "port," and insert -- port; --, therefor.

In Column 14, Line 53, in Claim 10, delete "state;" and insert -- state: --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*